Figure 1:
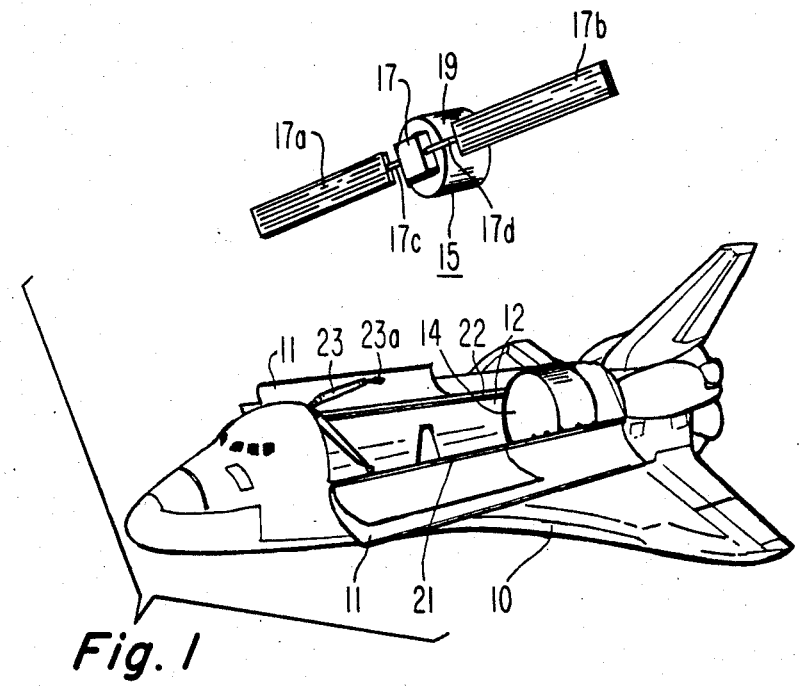

United States Patent [19]

Fuldner et al.

[11] Patent Number: 4,657,211
[45] Date of Patent: Apr. 14, 1987

[54] SPACECRAFT TO SHUTTLE DOCKING METHOD AND APPARATUS

[75] Inventors: William V. Fuldner, Bucks County, Pa.; William E. Stoney, Princeton, N.J.

[73] Assignee: RCA Corporation, Princeton, N.J.

[21] Appl. No.: 673,484

[22] Filed: Nov. 20, 1984

[51] Int. Cl.4 .............................................. B64G 1/64
[52] U.S. Cl. ................................ 244/161; 244/158 R
[58] Field of Search ..................... 244/158 R, 161, 162

[56] References Cited

U.S. PATENT DOCUMENTS 4,079,904  3/1978  Groskopfs et al. ................. 244/161
4,273,305  6/1981  Hinds ............................... 244/158 R
4,298,178  11/1981  Hujsak ............................. 244/161

Primary Examiner—Galen L. Barefoot
Assistant Examiner—Rodney Corl
Attorney, Agent, or Firm—Joseph S. Tripoli; Robert L. Troike

[57] ABSTRACT

A method is disclosed for docking a satellite to the STS or space shuttle orbiter with one Remote Manipulator System (RMS). The RMS is deployed and captures a fixture on the satellite. The satellite extends its mooring boom. The RMS manuevers the satellite to engage the free end of the boom onto a fixture on the orbiter. This method of docking is used in conjunction with exchanging a new payload module on the orbiter with a spent payload module on the satellite.

3 Claims, 10 Drawing Figures

SPACECRAFT TO SHUTTLE DOCKING METHOD AND APPARATUS

This invention relates to a method for docking a spacecraft in a fixed position relative to the space shuttle orbiter and more particularly to such a docking technique for use in exchanging payloads or major elements of the spacecraft.

The Space Transportation System (STS) also commonly referred to as the "space shuttle orbiter" has made it possible to rendezvous with existing satellites, retrieve the satellites, perform repairs or modifications and release the satellites or to bring the satellites back down to earth. The Remote Manipulator System (RMS) located on the space shuttle orbiter is used for retrieving and deploying the satellites.

Using the space shuttle orbiter it is planned to launch spacecraft consisting of two or more modules into orbit from the orbiter, then at some later date, to retrieve that spacecraft, to replace one of the modules with another identical module, and to return the original module to earth, leaving the newly assembled modules on orbit.

These spacecraft may comprise, for example, a control module and a factory module wherein the factory module is a payload factory that produces, for example, a new pharmaceutical drug in low gravity. The factory with the produced drugs, for example, may be retrieved and returned to earth. In the retrieval process a new factory module or payload module would be coupled to the control module of the spacecraft. The control module would contain all of the normal satellite functions for doing attitude control, orbit control generating all the power used by both the satellite and the factory and any communication equipment or antennas etc.

The on-orbit exchange of these three spacecraft modules—the spent payload module or factory module, the new factory module, and the control module—is referred to as a three body handling problem. This disclosure describes a means for handling these multiple bodies in space using the existing RMS on the space shuttle orbiter without extravehicular activity by the astronauts and without carrying extra devices on the shuttle orbiter. This disclosure describes a method and apparatus for handling the spacecraft without retracting the solar panels or getting the solar panels close to the shuttle body.

SUMMARY OF THE INVENTION

In accordance with one embodiment of the present invention, a novel method for docking the spacecraft to the space shuttle orbiter comprises the steps of maneuvering the orbiter near the satellite, capturing the satellite with the end effector of the RMS, deploying from the control module of the spacecraft an elongated boom, using the RMS maneuvering the spacecraft with the extended boom so that the boom engages a grappling fixture on the space shuttle orbiter to achieve docking.

IN THE DRAWING

Figure 2:
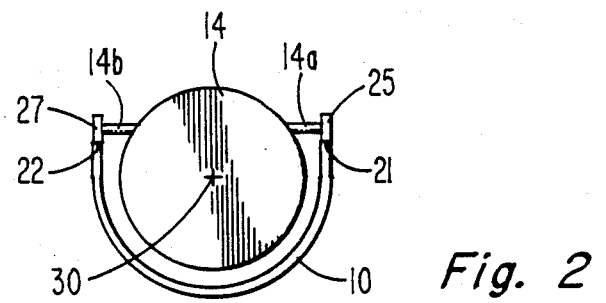
Figure 3:
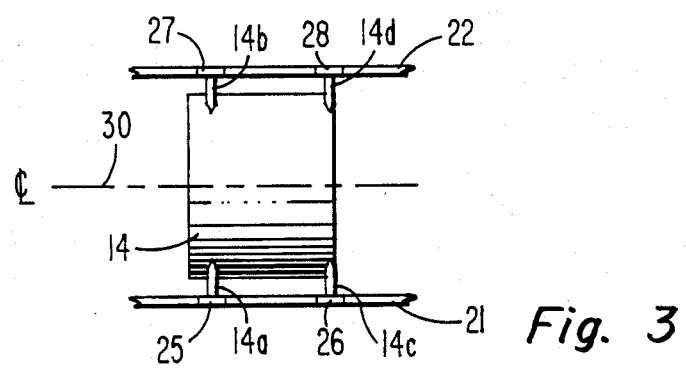
Figure 4:
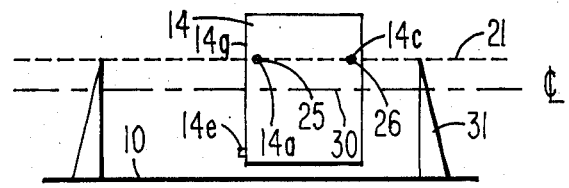
Figure 5:
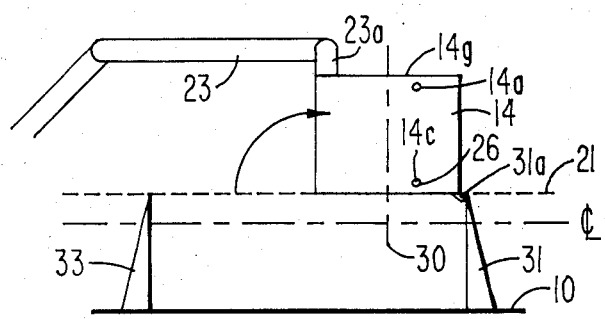
Figure 7:
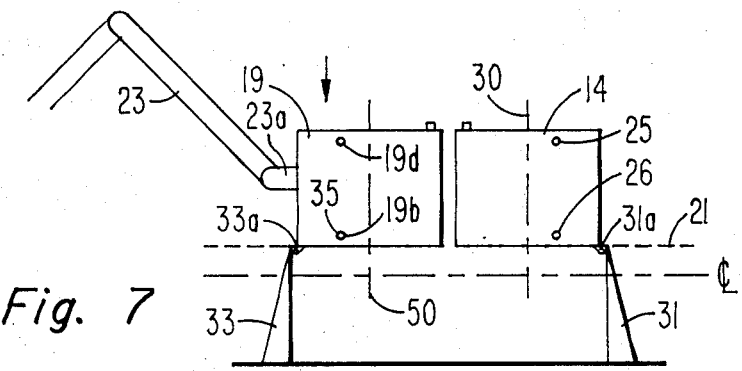
Figure 8:
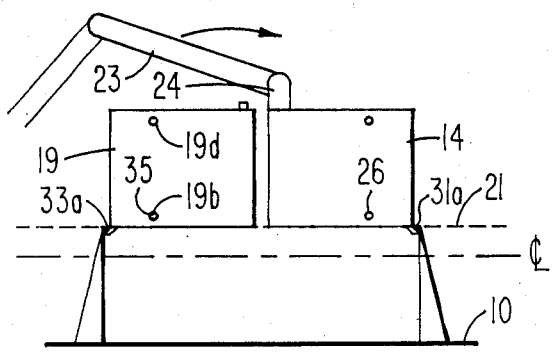
Figure 10:
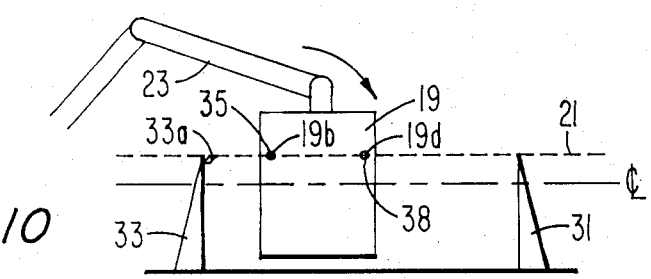
Figure 6:
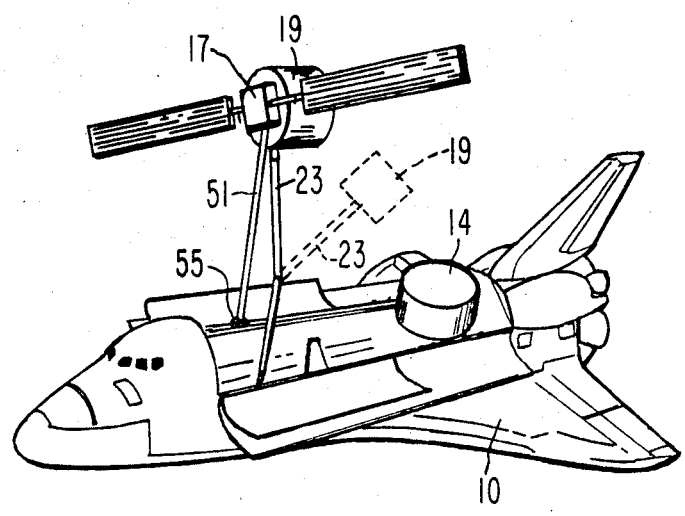
Figure 9:
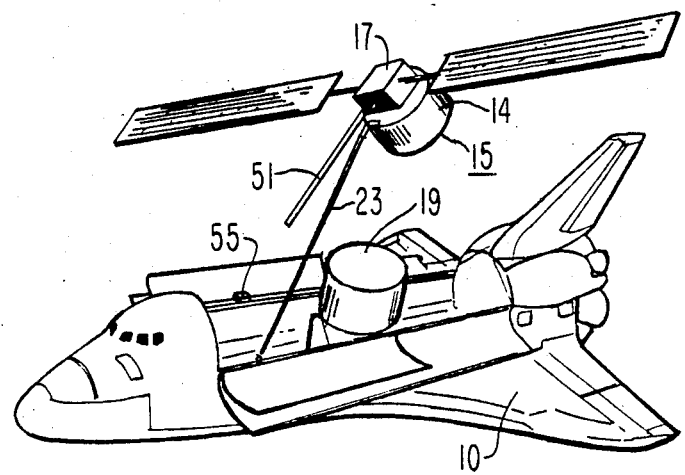

FIG. 1 illustrates the space shuttle orbiter near a satellite to be serviced,

FIG. 2 is a sketch of the end view of the new payload module in the cargo bay of the space shuttle orbiter of FIG. 1, FIG. 3 is a sketch of the top view of the new payload module of FIG. 2 in the space shuttle orbiter, FIG. 4 is a functional sketch of the payload module in the cargo bay of the orbiter, FIG. 5 is a functional sketch of the payload module rotated 90°, FIG. 6 illustrates the boom extending from the satellite to the orbiter, FIG. 7 is a functional sketch of the used payload module adjacent the new payload module in the orbiter, FIG. 8 is a functional sketch of the new module being raised to the control module, FIG. 9 illustrates the space shuttle orbiter with the new payload module attached to the control module and the boom being retracted, and FIG. 10 is a functional sketch of the old payload module being rotated and stowed.

Referring to FIGS. 1 through 4 there is illustrated the STS or space shuttle orbiter 10 with the cargo bay doors 11 open revealing a new payload module 14, which has its centerline axis 30 generally aligned with the centerline of the cargo bay 12. The space shuttle orbiter 10 has been maneuvered near a free flying satellite 15 comprising a control module 17 and an attached payload module 19. The satellite may also be brought to the orbiter 10 orbit from some other orbit such as geosynchronous. The payload modules may be, for example, factory modules. The payload module 19 is like that of payload module 14 and is connected by detachable mounting means to the control module 17. The control module 17 is a typical satellite with its own attitude and position sensors, attitude and position control systems, thrusters and fuel tanks, communication antennas and power bus. The power bus includes solar array panels illustrated by 17a and 17b on extended arms 17c and 17d. The power bus may also power the payload through the mounting means.

The payload module 14 or 19 includes two sets of trunnions where each set includes a pair of trunnions that extend from the opposite sides and mate with latchings which are located on the longitudinally extending top longerons 21 and 22 of the cargo bay 12. The longerons 21 and 22 extend the longitudinal length of the cargo bay above the cargo door hinges. Referring to FIGS. 2 and 3 the new payload module 14 includes a forward set of trunnions 14a and 14b which are pivotally mounted by two latches 25 and 27 to the longerons 21 and 22 respectively of the orbiter cargo bay 12. The payload module 14 includes an aft set of trunnions 14c and 14d which are pivotally mounted by two latches 26 and 28 on longerons 21 and 22 on opposite sides of the orbiter bay 12. The latches 25–28 have bearings therein to permit rotation of the trunnions therein. The latches may be opened or closed by remote control using solenoids for example. Such latches are well known. The trunnions are aligned and as shown in FIG. 2 are slightly above the centerline of the cargo bay and the module 14. These trunnions fit into latching members so that when the two forward latches 25 and 27 are released and opened, the payload can be pivoted in the latches 26 and 28 at the aft trunnions 14c and 14d.

The space shuttle orbiter 10 includes a Remote Manipulator System (RMS) 23 or remote manipulator assembly which has one end coupled to the longeron 21 near the cabin end. The RMS is remotely controlled by astronauts in the aft flight deck of the orbiter. The RMS comprises three sections which are joined by movable joints with the remote end 23a having a wrist joint and what is termed an "end effector." The end effector is adapted to mate with and attach to or decouple from fittings on the satellite control module or payload module.

Referring to FIG. 4 there is illustrated a sketch of the new payload module 14 in its stored position as illustrated in FIGS. 1, 2 and 3. As represented in FIGS. 1 through 4 the module payload 14 is fixed to the space shuttle orbiter 10 using the latches 25–28 at longerons 21 and 22 located above the centerline of the bay. Support fittings 31 and 33 extend from the space shuttle orbiter keel through the centerline of the cargo bay near the payload module 14.

In accordance with the method described herein, the RMS 23 is first oriented so that the end effector 23a grasps onto and captures a fitting 14e on the payload module 14 as shown in FIG. 4. The latches coupling the trunnions 25 and 27 holding forward trunnions 14a and 14b are released. The RMS 23 coupled to the payload module 14 at 14e rotates the payload module 14 90° about the trunnions 14c and 14d so the payload module axis 30 that was aligned with the longitudinal centerline of the cargo bay 12 is perpendicular to the orbiter cargo bay 12. See FIG. 5. In this manner the control module mating surface 14g of module 14 extends away from the cargo bay towards space. This surface 14g includes the adapter for mounting the control module 17. When the payload module 14 has been rotated 90° on the aft trunnions 14c and 14d, the payload module 14 is latched to the vertical extending keel support fitting 31 using releasable automatic latch 31a. RMS 23 is then disconnected and withdrawn.

The control module 17 contains an extendible boom such as an astromast or an articulated boom to effect the docking and provide the necessary retention of physical and structural coupling between the spacecraft to be serviced and the space shuttle orbiter. The detailed design choice of the type of extendible boom is made based on the mass and the inertial properties of the spacecraft to be serviced and the resulting required stiffness of the boom to maintain the orbiter/spacecraft geometry assuming the verneer attitude control system of the space shuttle orbiter is active and occassionally performing small thrusting manuevers to retain the orbiter at the desired attitude.

The space shuttle orbiter 10 is equipped with a standard grapple 55, for example, which extends along the longeron 22 of the cargo bay 12. The grapple may be mounted anywhere consistent with the space shuttle orbiter constraints and with the plan for movement of hardware by the RMS for the particular servicing operation.

In accordance with the operation of the system the spacecraft 15 active control systems are disabled. The RMS 23 then captures the spacecraft 15 with the end effector at a center grapple on the side of the old payload module 19 as shown in FIG. 6. The spacecraft 15 then deploys by command the extendible boom 51 which is equipped with the standard end effector on the free end. The spacecraft 15 is then maneuvered under the RMS 23 by the control of the astronaut in the aft flight deck until the free end of the boom 51 is fixed to the grapple fixture 55 on longeron 22 and latched thereto, thereby achieving docking condition. The old payload module 19 is then separated and detached from the control module 17 and brought down as shown by dashed lines in FIG. 6 and placed by the RMS 23 in the cargo bay 12 adjacent to the rotated module 14 as shown in FIG. 7. The RMS 23 is then operated to place the old module 19 as shown in FIG. 7 with its axis 50 perpendicular to the longitudinal centerline of the cargo bay of the space shuttle orbiter 10 and with the old payload module 19 oriented with the control module attachment fittings out or away from the bay. The old payload module 19 is placed in the bay rotated 180° about its axis 50 with respect to the new payload module 14. The RMS 23 places the payload module 19 such that aft trunnions 19a and 19b (not shown) latch to the forward latches 35 and 37 (not shown) on longerons 21 and 22 and also such that the support fitting 33 is latched to one corner of the used payload module 19 at latch 33a. This separation or connection of the control module 17 from the payload modules may be achieved by a motor driven screw member on the payload module into a threaded aperture in the control module. The payload module may contain alignment pins for holes in the control module.

The RMS 23 is disconnected from the old payload module 19 and connected to a similar grapple fixture 14e of the new payload module 14 as shown in FIG. 8. The latches 26, 28 and 31a are opened and the RMS moves the payload module 14 to the boom mounted control module 17. The RMS 23 maneuvers the payload module 14 into alignment with the control module 17 which is held off by the boom 51. Because the control module with the solar panels remains remote from the space shuttle orbiter these deployed panels do not touch the orbiter and they do not need to be folded. The payload module 14 after being aligned with the control module is attached by the motor driven screw to the control module 17. The boom 51 is then retracted. The boom 51 partially retraced is illustrated in FIG. 9. The RMS 23 is returned to the cargo bay and coupled to the used payload module 19. The latch 33a is opened and the RMS rotates the old payload module 19 about its aft trunnions 19a and 19b to position the payload centerline along the longitudinal centerline of the space shuttle orbiter bay 12 in a stowed position so that the doors can then be closed. The module 19 is then latched into position by latches 36 (not shown) and 38 on the trunnions 19c and 19d. The RMS 23 is then placed in its stowed position before closing the doors 11 and returning to earth with the used payload module 19.

What is claimed is:

1. A method for docking a satellite to the space shuttle orbiter for remote servicing without retracting deployed elements such as the solar panels using the RMS comprising the steps of:

maneuvering said orbiter and/or satellite so the RMS can reach said satellite, capturing the satellite with the RMS, deploying a boom from the satellite, and maneuvering the satellite with extended boom using the RMS so the free end of the boom engages a fixture on the orbiter to achieve docking with the satellite spaced by the boom a predetermined distance from the orbiter.

2. A method of exchanging payload modules on a multiple module satellite system comprising a control module and a detachable payload module using one RMS on the space shuttle orbiter comprising the steps of:

maneuvering said orbiter containing a new payload module near the multiple module satellite, rotating the new payload module using said RMS so that the control module attachment faces away from the bay of said orbiter, capturing the multiple module satellite with said RMS, deploying a stiff boom with an end effector at the free end from the control module of the satellite, maneuvering said satellite with the RMS so the free end of the boom equipped with an end effector engages a fixture on the orbiter to achieve docking with the satellite spaced by the boom a predetermined distance from the orbiter, removing said payload module using said RMS from the control module and placing it in said orbiter bay, using said RMS moving said new payload module from said orbiter bay to said control module held off from the orbiter by said boom, attaching said control module on the new payload module, releasing and then retracting said boom, releasing said new payload module and said satellite, and rotating said old payload module into its position for return to earth in the orbiter cargo bay.

3. A spacecraft capable of exchanging its payload for another payload in space using the RMS in the space shuttle orbiter comprising:

a payload module;

a control module containing the satellite control and operating system, power bus and solar arrays, means for detachably coupling said payload module to the control module for servicing the payload module in orbit or returning it to earth, said payload module including trunnions on the sides thereof for mounting on latches in the cargo bay of the orbiter and fittings for capturing by the RMS; and a deployable boom coupled to and extending from said control module so that said control module is spaced by the boom a predetermined distance from the orbiter, said boom being relatively stiff and including a capturing means at the free end for capturing and holding to a fixture on said orbiter.

* * * * *